(12) United States Patent
Ponce et al.

(10) Patent No.: US 10,372,643 B1
(45) Date of Patent: Aug. 6, 2019

(54) BIT-MAPPED DMA TRANSFER WITH DEPENDENCY TABLE CONFIGURED TO MONITOR STATUS SO THAT A PROCESSOR IS NOT RENDERED AS A BOTTLENECK IN A SYSTEM

(71) Applicant: BITMICRO LLC, Reston, VA (US)

(72) Inventors: Cyrill C. Ponce, Malabon (PH); Marizonne O. Fuentes, Tanauan (PH); Gianico G. Noble, San Pedro (PH)

(73) Assignee: BITMICRO LLC, Reston, VA (US)

( * ) Notice: Subject to any disclaimer, the term of this patent is extended or adjusted under 35 U.S.C. 154(b) by 0 days.

(21) Appl. No.: 16/056,563

(22) Filed: Aug. 7, 2018

Related U.S. Application Data

(63) Continuation of application No. 15/603,434, filed on May 23, 2017, now Pat. No. 10,042,799, which is a continuation of application No. 14/687,700, filed on Apr. 15, 2015, now Pat. No. 9,672,178, which is a continuation-in-part of application No. 14/217,467, filed on Mar. 17, 2014, now Pat. No. 9,400,617, application No. 16/056,563, which is a continuation of application No. 15/943,620, filed on Apr. 2, 2018, now abandoned, which is a continuation of
(Continued)

(51) Int. Cl.
*G06F 13/00* (2006.01)
*G06F 13/37* (2006.01)
*G06F 3/06* (2006.01)
*G06F 13/28* (2006.01)

(52) U.S. Cl.
CPC .............. *G06F 13/37* (2013.01); *G06F 3/061* (2013.01); *G06F 3/0656* (2013.01); *G06F 3/0683* (2013.01); *G06F 13/28* (2013.01); *G06F 13/287* (2013.01)

(58) Field of Classification Search
CPC ............................. G06F 13/37; G06F 13/287
See application file for complete search history.

(56) References Cited

U.S. PATENT DOCUMENTS

| 8,930,620 B2* | 1/2015 | Vemuri | G06F 3/0613 711/114 |
| 9,400,617 B2* | 7/2016 | Ponce | G06F 3/0683 |

(Continued)

*Primary Examiner* — Tammara R Peyton
(74) *Attorney, Agent, or Firm* — Jackson Walker L.L.P.

(57) ABSTRACT

In an embodiment of the invention, a method comprises: A method, comprising: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table. In another embodiment of the invention, an apparatus comprises: a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the subindex is in the dependency table.

20 Claims, 4 Drawing Sheets

Related U.S. Application Data application No. 15/217,947, filed on Jul. 22, 2016, now Pat. No. 9,934,160, which is a continuation of application No. 14/217,467, filed on Mar. 17, 2014, now Pat. No. 9,400,617.

(60) Provisional application No. 61/802,367, filed on Mar. 15, 2013, provisional application No. 61/979,878, filed on Apr. 15, 2014.

(56) References Cited

U.S. PATENT DOCUMENTS

| | | | | |
|---|---|---|---|---|
| 9,501,436 B1 * | 11/2016 | Bruce | ............... | G06F 13/28 |
| 9,672,178 B1 * | 6/2017 | Ponce | ............... | G06F 13/37 |
| 10,042,799 B1 * | 8/2018 | Ponce | ............... | G06F 13/37 |
| 2011/0196994 A1 * | 8/2011 | Harada | ............... | G06F 13/28 |
| | | | | 710/22 |

* cited by examiner

| Field 1: Request type | Field 2: index number | Field 3: subindex number | Field 4: depends on request type |
|---|---|---|---|
| update | Index number | Subindex number | NA |
| monitor | Index number | Subindex number | Monitoring channel number |

Figure 1B

BIT-MAPPED DMA TRANSFER WITH DEPENDENCY TABLE CONFIGURED TO MONITOR STATUS SO THAT A PROCESSOR IS NOT RENDERED AS A BOTTLENECK IN A SYSTEM

This application is a continuation of application Ser. No. 15/603,434, filed 23 May 2017 and issuing as U.S. Pat. No. 10,042,799 on 7 Aug. 2018, which is a continuation of application Ser. No. 14/687,700, filed 15 Apr. 2015 and issued as U.S. Pat. No. 9,672,178 on 6 Jun. 2017, which is a continuation in part of application Ser. No. 14/217,467, filed 17 Mar. 2014 and issued as U.S. Pat. No. 9,400,617 on 26 Jul. 2016, which claims priority from App. No. 61/802,367, filed 15 Mar. 2013. application Ser. No. 14/687,700, filed 15 Apr. 2015 and issued as U.S. Pat. No. 9,672,178 on 6 Jun. 2017, also claims the benefit of U.S. Provisional Application 61/979,878, filed Apr. 17, 2014. Each of these applications is incorporated by reference herein, in its entirety.

FIELD OF INVENTION

Embodiments of the invention relate generally to a data storage system which is applied to a computer system that includes volatile (e.g., SRAM, SDRAM) and non-volatile (e.g., flash memory, mechanical hard disk) storage components.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

Conventionally, with data transfer systems without a dependency table, the approach is to use a buffer. Data is transferred from a memory to a buffer and then from the buffer to an IO (input/output) bus. Also, data is transferred from the IO bus to the buffer and then from the buffer to the memory. In order to ensure the transfer of valid data, a DMA (direct memory access engine) with full-time processor intervention through reception of interrupts is required. For example, every after data transfer from the IO bus to the buffer, the processor will receive an interrupt signifying that the data needed by the memory is already in the buffer, and vice versa.

1. Long Data Latency

The prior approach has no hardware-assisted concept of dependency which results to more reliance on firmware (i.e., in between transfer boundaries, the processor has to interfere to setup and enable the next transfer). These operations result in utilizing precious processor cycles.

2. High Probability of Invalid Data

Since the firmware takes the responsibility of keeping track of the data and, considering the fact that the processor is also doing other background tasks, the data being tracked is subject to high risk of being lost.

Accordingly, various conventional approaches suffer from at least the above-mentioned deficiencies and/or disadvantages.

SUMMARY

Embodiments of the invention relate generally to a data storage system which is applied to a computer system that includes volatile (e.g., SRAM, SDRAM) and non-volatile (e.g., flash memory, mechanical hard disk) storage components.

A basis of an embodiment of the invention is the Hardware-assisted DMA Transfer with Dependency. One or more of the features in commonly-owned and commonly-assigned U.S. patent application Ser. No. 14/217,467 may apply in one or more embodiments of the invention. An embodiment of the invention, which is a bit-mapped dependency table, is one application or implementation of a dependency table in a system disclosed in U.S. patent application Ser. No. 14/217,467.

An embodiment of the present invention provides a feature for a hardware-based step-by-step data transfer completion notification mechanism between the processor and DMA (Direct Memory Access) engines. An embodiment enables the execution time of the processor to focus on setting-up of DMA engines, rather than being the one to enable the dependent DMA engines to run exactly at the time when the data to be transferred is already waiting for processing in the memory, which renders the processor as the bottleneck of system.

In an embodiment of the invention, a method comprises: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table.

In another embodiment of the invention, an article of manufacture, comprises: a non-transient computer-readable medium having stored thereon instructions that permit a method comprising: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table.

In yet another embodiment of the invention, an apparatus comprises: a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the subindex is in the dependency table.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

FIG. 1B is a diagram illustrating fields in an update request or monitor request issued by a DMA (Direct Memory Access) engine, in accordance with an embodiment of the invention.

DETAILED DESCRIPTION

Figure 1A:
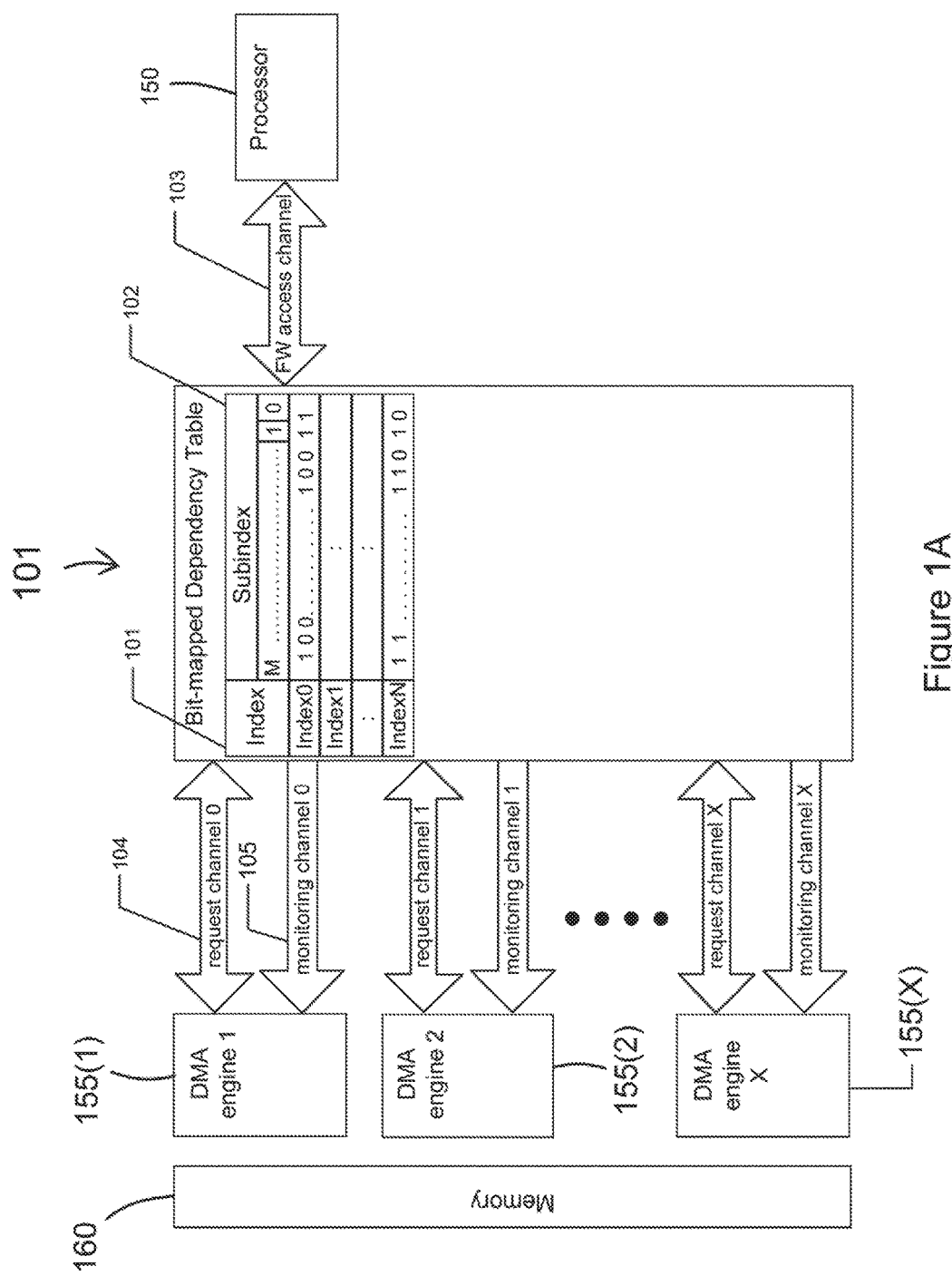
FIG. 1A is a diagram illustrating a bit-mapped dependency table, in accordance with an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ." Also, the term "couple" (or "coupled") is intended to mean either an indirect or direct electrical connection. Accordingly, if one device is coupled to another device, then that connection may be through a direct electrical connection, or through an indirect electrical connection via other devices and/or other connections.

An embodiment of the invention, which is a bit-mapped dependency table, is one application or implementation of a dependency table in a system for hardware-assisted DMA transfer with dependency disclosed in U.S. patent application Ser. No. 14/217,467.

An embodiment of the present invention provides a feature for a hardware-based step-by-step data transfer completion notification mechanism between the processor and DMA engines. An embodiment enables the execution time of the processor to focus on setting-up of DMA engines, rather than being the one to enable the dependent DMA engines to run exactly at the time when the data to be transferred is already waiting for processing in the memory, which renders the processor as the bottleneck of system.

FIG. 1A is a diagram illustrating a bit-mapped dependency table 100 in a system 101, in accordance with an embodiment of the invention. The table 100 is composed of N number of indices 101, each index includes an M number of subindices 102, and each subindex corresponds to the status of a DMA engine transfer. In FIG. 1A, the indices 101 includes Index 0, Index 1, through Index N. The numbers M and N may be any suitable integer numbers. A '1' indicates that a transfer is done or completed, and a '0' indicates that a transfer is still pending.

The table 100 also has the following interfaces: FM (firmware) access channel 103, request channels 104 (ranging from 0 to X, where X is a suitable integer number) (i.e., request channels (0) to (X) 104), and monitoring channels 105 (ranging from 0 to X) The other blocks in the drawing (processor 150, DMA engines 155(1), 155(2) through 155(X) and referred to general as DMA engine(s) 155, and memory 160) are not part of a bit-mapped dependency table in one embodiment of the invention. Upon power on reset, all subindices 101 are initialized to a status of '1', signifying that there are no pending data transfers. The processor 150 writes to or reads in the table 100 on a per index basis using the FW access channel 103, and, therefore, it is recommended that the processor 150 assigns the subindices 102 of related DMA engine transfers in a single index 101, and that the processor 150 perform these assignments in a single index write for fast execution.

The processor 150 also sets up descriptors in memory such that each descriptor correspond to a certain DMA engine transfer, and each DMA engine transfer corresponds to a certain subindex 102 bit in the dependency table 100. Once a sufficient number of descriptors are setup, the processor 150 can enable the DMA engines 155 to execute the descriptors in memory. Dependent descriptors, which are descriptors which will only be processed by a DMA engine 155 when certain transfers are already done, request to monitor the status of the subindex in which its transfer depend on, using request channel 104. As a result of these requests, the DMA engines 155 can monitor the status of a selected index (subindex bits) using monitoring channels 105. In case of an error in a data transfer, related descriptors can be aborted and disabled by the processor 150 in memory, the concerned DMA engines 155 can also be stopped, and the processor 150 then writes all '1' in the index related to the aborted transfers in the dependency table 100. Since it was mentioned that the status subindices 102 of related data transfers is recommended to be assigned in a single index 101, the processor 150 can force the status of related transfers to '1' in a single index write, usually signifying that the related transfers are already finished, but in this case they were aborted.

An example of an actual process of using a Bit-mapped Dependency Table was discussed in the system for Hardware-assisted DMA Transfer with Dependency as disclosed in U.S. patent Ser. No. 14/217,467.

The request channels 104 and monitoring channels 105 are typically tightly coupled, as will be discussed later in this disclosure, and will be started with the discussion of the formats of the two types of requests to the dependency table 100 as shown in Table 1 and FIG. 1B.

TABLE 1

| Field 1: Request | Field 2: index number | Field 3: subindex number | Field 4: depends on request type |
|---|---|---|---|
| Update | Index number | Subindex number | NA |
| Monitor | Index number | Subindex number | Monitoring channel number |

An update request will be issued by a DMA engine 155 if that DMA engine 155 is already finished executing a descriptor, which means that DMA engine 155 is already finished with a transfer. The update request instructs the dependency table 100 to switch a subindex bit from '0' to '1'. A target subindex 102 to be switched is addressed by field 2 and field 3 as shown in Table 1.

A monitoring request will be issued by a DMA engine 155 if the descriptor that it is executing depends on a prior transfer to finish. The monitoring request instructs the dependency table 100 to route a particular subindex bit out to a monitoring channel bit (field 4 in Table 1). The requesting DMA engine 155 monitors the monitoring channel bit, which in effect means that the requesting DMA engine 155 actually monitors the target subindex 102. The subindex 102 to be monitored represents the status of the transfer that the current transfer depends on. The target subindex 102 to be monitored is addressed by field 2 and field 3. Since a monitoring channel 105 is composed of many number of bits (which depends on design and application), field 4 selects in which the monitoring channel bit that the selected target subindex 102 will be monitored on.

Figure 2:
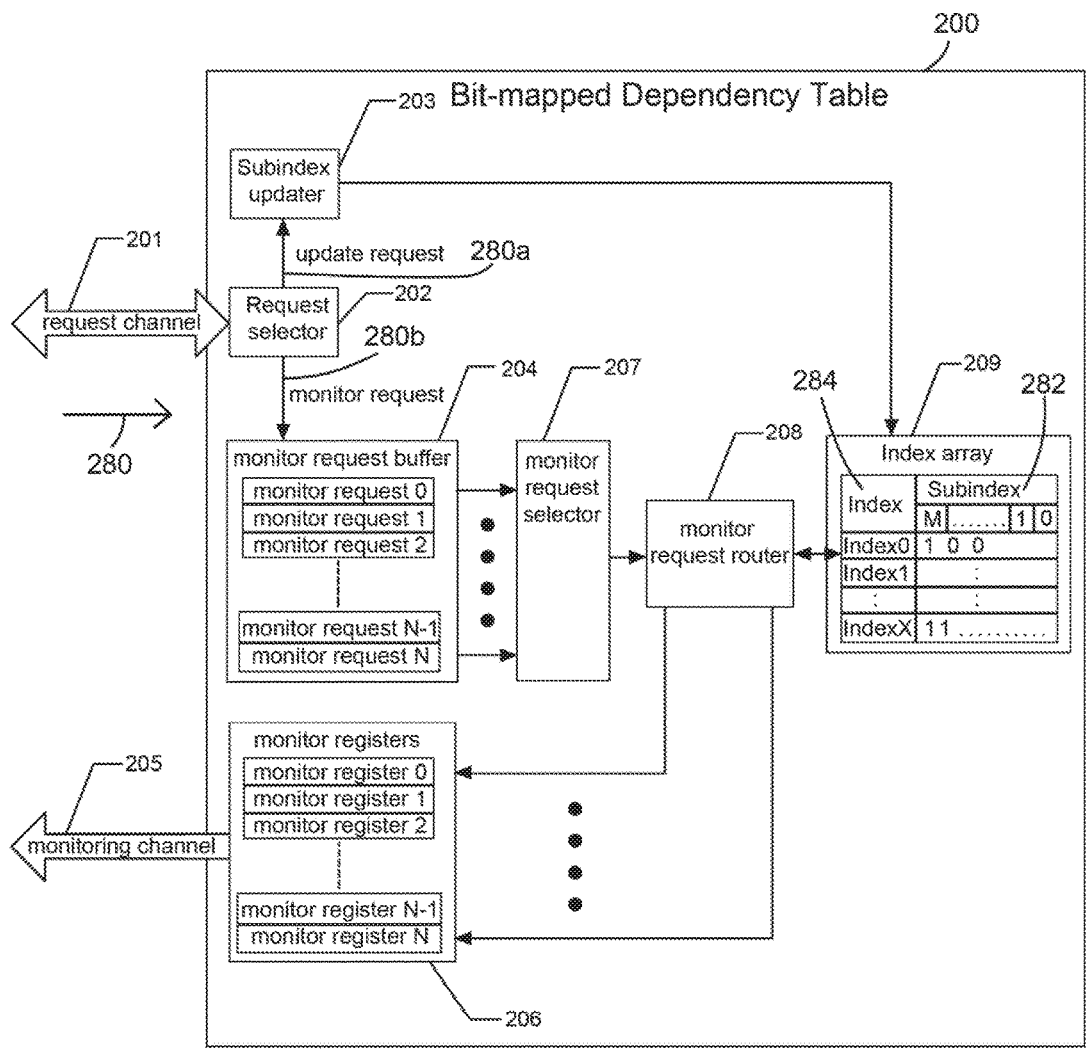
FIG. 2 is a diagram of internal blocks of a bit-mapped dependency table, wherein the internal blocks are involved with the execution of a request, in accordance with an embodiment of the invention.

FIG. 2 is a diagram of internal blocks of a bit-mapped dependency table 200, wherein the internal blocks are involved with the execution of a request, in accordance with an embodiment of the invention.

FIG. 2 shows an example request channel 201 and the relationship of the channel 201 to its corresponding monitoring channel 205. A request 280 is issued by a DMA engine 155 (FIG. 1A) using request channel 201, and a request selector 202 routes the request 280. If the request 280 is an update request 280a, the request 280 is routed to subindex updater 203, wherein the target subindex 282 (in indices 284) is immediately updated in index array 209. If the request 280 is a monitor request 280b, the request 280 is routed by the request selector 202 to monitor request buffer 204. The monitoring channel number field in the monitor request 280b determines the monitor request number in the monitor request buffer 204. The monitor request numbers are shown as monitor request 0, monitor request 1, monitor request 2 through monitor request N-1 and monitor request N. For example, a monitor request 280b for monitoring channel 205 bit 2 will be placed in monitor request 2, and upon routing to monitoring channel 205 bit 2, will be stored in monitor register 2 in the monitor registers 206. The monitor request selector 207 selects which monitor request 280b will be executed by monitor request router 208. The algorithm of monitor request selector 207 varies from, but not limited to, arbitrated (if monitor request buffer 204 is partially filled) and round-robin (if monitor request buffer 204 is full). The algorithm is typically optimized for fastest execution of the requests 280b in the monitor request buffer 204. Once a monitor request 280b is selected, monitor request router 208 routes the target subindex 282 from index array 209 to the corresponding monitor register in monitor registers 206, and subsequently out to the corresponding bit in monitoring channel 205.

Figure 3:
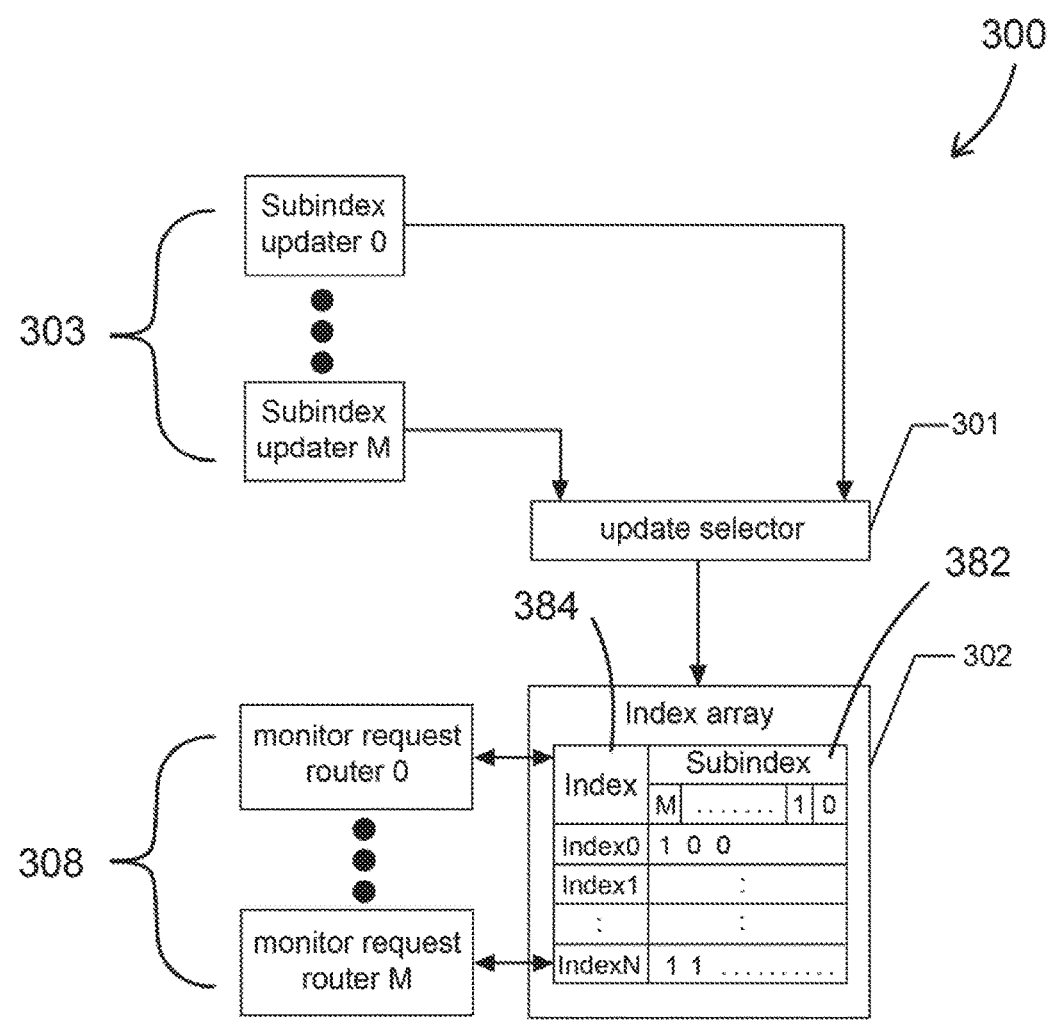
FIG. 3 is a diagram of an example bit-mapped dependency table with multiple subindex updaters and multiple monitor request routers, in accordance with an embodiment of the invention.

FIG. 3 is a diagram of an example bit-mapped dependency table 300 with multiple subindex updaters 303 and multiple monitor request routers 308, in accordance with an embodiment of the invention. The multiple subindex updaters 303 are shown by subindex updater 0 through subindex updater M), for example, and the multiple monitor request routers 308 are shown by monitor request router 0 through monitor request router M), for example. The bit-mapped dependency table 300 also includes the other internal blocks of the bit-mapped dependency table 200 if FIG. 2, but are omitted in FIG. 3 for purposes of brevity or clarity.

These multiple subindex updaters 303 and multiple monitor request routers 308 are used when there are multiple DMA engines 155 connected to the dependency table 100 like the one shown in FIG. 1, which means that there are multiple request channels 104 (FIG. 1) and multiple monitoring channels 105. For update requests, the update selector 301 selects which subindex updater 303 will be granted to write to index array 302. The update selector 301 gives fair write grant opportunities to all subindex updaters 303 such as, for example, by use of a round-robin selection process or another arbitration process. Since subindex monitoring is a read only operation, multiple monitor request routers 308 can read the subindices 382 (in indices 384) in index array 302 at the same time.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A direct memory access (DMA) method, comprising:
identifying one or more dependent data transfers associated with one or more DMA engines;
maintaining data transfer completion (DTC) information indicative of a completion status of one or more predicate data transfers, wherein the DTC information includes a DTC bit corresponding to each of the one or more predicate data transfers and wherein a dependent data transfer comprises a data transfer dependent on completion of a predicate data transfer;
responsive to detecting execution of a first dependent data transfer, wherein the first dependent data transfer depends on completion of a first predicate data transfer, monitoring the DTC bit corresponding to the first predicate data transfer; and
responsive to detecting completion of the first predicate data transfer, updating the DTC bit corresponding to the first predicate data transfer.

2. The method of claim 1, wherein the DTC information comprises a DTC table including a DTC index array comprising a plurality of DTC index rows, wherein each of the plurality of DTC index rows includes a plurality of DTC sub-indices.

3. The method of claim 2, wherein each DTC subindex is associated with a corresponding data transfer.

4. The method of claim 2, wherein monitoring the DTC bit comprises sending a monitoring request to the DTC table via a monitoring channel between a first DMA engine and the DTC index array and wherein updating the DTC bit comprises sending an update request to the DTC index array via a request channel, wherein the monitoring channel and the request channel are distinct channels.

5. The method of claim 4, wherein the one or more DMA engines include a plurality of DMA engines and wherein each DMA engine is associated with a corresponding monitoring channel and a corresponding request channel.

6. The method of claim 2, wherein the DTC table includes a monitor request buffer configured to buffer monitoring requests and wherein the DMA method includes:
selecting a monitoring request in the monitor request buffer comprises using an arbitrated algorithm if the monitor request buffer is partially filled with monitoring requests.

7. The method of claim 2, wherein the DTC table includes a monitor request buffer configured to buffer monitoring requests and wherein the DMA method includes:
selecting a monitoring request in the monitor request buffer comprises using a round-robin algorithm if the monitor request buffer is full of monitoring requests.

8. The method of claim 1, wherein each of a plurality of DMA engines uses a corresponding one of a plurality of monitoring request routers that execute monitoring requests from the DMA engines.

9. The method of claim 2, further comprising:
routing a target subindex in an index from the DTC table to a corresponding monitor register and subsequently out to a corresponding bit in a monitoring channel.

10. A system, comprising:
a processor;
one or more Direct Memory Access (DMA) engines; and
a data transfer resource, wherein the data transfer resource is:
coupled to the processor and to each of the one or more DMA engines; and
configured to perform DMA operations, comprising:
identifying one or more predicate data transfers associated with the one or more DMA engines, wherein a predicate data transfer comprises a data transfer associated with a dependent data transfer and wherein completion of the dependent data transfer depends on completion of the predicate data transfer;
maintaining data transfer completion (DTC) information, wherein the DTC information includes one or more DTC bits corresponding to the one or more predicate data transfers and wherein a DTC bit indicates a completion status of a corresponding predicate data transfer; and
providing at least a portion of the DTC information to at least one of the one or more DMA engines.

11. The system of claim 10, wherein identifying one or more predicate data transfers includes:
identifying a first predicate data transfer, wherein identifying the first predicate data transfer comprises receiving a first monitoring request from a particular DMA engine that detects a first dependent data transfer, wherein the first monitoring request identifies a first DTC bit and wherein the first DTC bit corresponds to the first predicate data transfer.

12. The system of claim 11, wherein the DMA operations include receiving one or more update requests from the one or more DMA engines, wherein an update request identifies a DTC bit, and wherein maintaining the DTC information includes:
responsive to receiving a particular update request identifying a particular DTC bit associated with a particular predicate data transfer, updating the particular DTC bit to indicate completion of the particular predicate data transfer.

13. The system of claim 10, wherein the data transfer resource includes a DTC array and wherein the DTC array includes:
a plurality of indices corresponding to a plurality of rows in the DTC array; and
a plurality of subindices corresponding to a plurality of columns in the DTC array.

14. The system of claim 13, wherein:
each update request and each monitoring request includes:
an index identifying a row in the DTC array; and
a subindex identifying a column in the DTC array.

15. The system of claim 14, wherein the data transfer resource includes a DMA interface between the DTC array and the one or more DMA engines, wherein the DMA interface includes one or more channels corresponding to each of the one or more DMA engines, wherein each of the one or more channels couples one of the one or more DMA engines to the DTC array.

16. The system of claim 14, wherein the data transfer resource includes a DMA interface between the DTC array and the one or more DMA engines, wherein the DMA interface includes one or more channel pairs corresponding to the one or more DMA engines, wherein each of the one or more channel pairs includes:
- a request channel configured to convey monitoring requests and update requests from a DMA engine to the DTC array; and
- a monitoring channel configured to convey at least a portion of the DTC array to one of the one or more DMA engines.

17. The system of claim 16, wherein the data transfer resource includes:
- a monitor request buffer configured to buffer monitoring requests;
- a monitoring request selector configured to select a particular monitoring request from the monitoring requests buffered in the monitor request buffer; and
- a monitoring request router configured to route a particular row of the DTC array to a particular monitoring channel, wherein the particular row of the DTC array comprises the row identified by the index of the particular monitoring request selected by the monitoring request selector.

18. The system of claim 14, wherein the data transfer resource includes:
- a request router coupled to a request channel and configured to:
  - route update requests to the DTC array; and
  - buffer monitoring requests in a monitor request buffer.

19. An article of manufacture, comprising:
a non-transient computer-readable medium having stored thereon processor-executable instructions that, when executed by a processor, cause the processor to perform a direct memory access (DMA) method comprising:
- identifying one or more dependent data transfers associated with one or more DMA engines;
- maintaining data transfer completion (DTC) information indicative of a completion status of one or more predicate data transfers, wherein the DTC information includes a DTC bit corresponding to each of the one or more predicate data transfers and wherein a dependent data transfer comprises a data transfer dependent on completion of a predicate data transfer;
- responsive to detecting execution of a first dependent data transfer, wherein the first dependent data transfer depends on completion of a first predicate data transfer, monitoring the DTC bit corresponding to the first predicate data transfer; and
- responsive to detecting completion of the first predicate data transfer, updating the DTC bit corresponding to the first predicate data transfer.

20. The article of manufacture of claim 19, wherein maintaining the DTC information includes maintaining a DTC array and wherein updating the DTC bit corresponding to the first predicate data transfer includes:
- updating a subindex bit value in the DTC array in response to receiving an update request.

* * * * *